United States Patent [19]

Drori

[11] Patent Number: 4,906,357

[45] Date of Patent: Mar. 6, 1990

[54] FILTER SYSTEM HAVING MULTIPLE FILTER ELEMENTS AND BACK FLUSHING ASSEMBLIES

[76] Inventor: Mordeki Drori, 89 Zahal Street, Kiron, Israel

[21] Appl. No.: 223,879

[22] Filed: Jul. 25, 1988

[30] Foreign Application Priority Data

Jul. 26, 1987 [IL] Israel .................................. 83329

[51] Int. Cl.⁴ .............................................. B01D 29/38
[52] U.S. Cl. ................................ 210/143; 210/333.01; 210/334; 210/346; 210/411; 210/413; 210/486
[58] Field of Search .................. 55/318, 323, 324, 330, 55/278, 230, 242; 210/332, 333.01, 333.1, 334, 346, 407, 409, 411, 412, 413, 414, 415, 486, 488

[56] References Cited

U.S. PATENT DOCUMENTS

| Re. 21,107 | 5/1939 | Seitz | 210/188 |
|---|---|---|---|
| 26,709 | 11/1969 | Linden et al. | 252/378 |
| 226,271 | 4/1880 | Blaisdell | 210/488 |
| 428,307 | 5/1890 | Leland | 210/488 |
| 623,324 | 4/1899 | Levi | 210/329 |
| 730,485 | 6/1903 | Simoneton | 210/488 |
| 1,581,998 | 4/1926 | Fulcher | 210/488 |
| 1,602,647 | 10/1926 | Carr | 137/872 |
| 1,642,864 | 9/1927 | Williams | 210/488 |
| 1,643,299 | 9/1927 | Furness | 210/488 |
| 1,673,743 | 6/1928 | Fulcher | 210/415 |
| 1,719,346 | 7/1929 | Thompson | 210/488 |
| 1,797,399 | 3/1931 | Boulade | 210/486 |
| 1,804,512 | 5/1931 | Pickard | 210/492 |
| 1,849,042 | 3/1932 | Pickard | 210/188 |
| 1,852,873 | 4/1932 | Berger | 210/334 |
| 1,906,391 | 5/1933 | McKinley | 210/413 |
| 1,926,557 | 9/1933 | Perkins | 210/167 |
| 1,929,246 | 10/1933 | Hechenbleikner | 183/50 |
| 1,955,903 | 4/1934 | Cammen | 210/130 |
| 1,976,547 | 10/1934 | Dumas | 210/169 |
| 2,137,556 | 11/1938 | Young | 210/488 |
| 2,330,945 | 10/1943 | Becker | 210/169 |
| 2,365,525 | 12/1944 | Cox | 210/492 |
| 2,374,756 | 5/1945 | Kisch et al. | 210/170 |
| 2,455,486 | 12/1948 | Hicks | 210/169 |
| 2,495,095 | 1/1950 | Ewbank | 210/169 |
| 2,507,827 | 6/1950 | Stafford | 123/44 |
| 2,508,602 | 5/1950 | Goetz | 210/203 |
| 2,519,506 | 8/1950 | Russell | 210/183 |
| 2,554,016 | 5/1951 | Czarnecki | 210/492 |
| 2,575,995 | 11/1951 | Briggs | 210/492 |
| 2,583,423 | 1/1952 | Hallinan | 210/185 |
| 2,631,732 | 3/1953 | Vocelka | 210/492 |
| 2,654,440 | 10/1953 | Robinson | 210/492 |
| 2,665,813 | 1/1954 | Bollaert | 210/283 |
| 2,670,851 | 3/1954 | Curtis | 210/120 |
| 2,692,686 | 10/1954 | Fleck et al. | 210/488 |
| 2,696,306 | 12/1954 | Gomery | 210/425 |
| 2,702,637 | 2/1955 | Shepard | 210/492 |
| 2,742,158 | 4/1956 | Schuller | 210/152 |
| 2,757,802 | 8/1956 | Schmid | 210/169 |
| 2,758,877 | 8/1956 | Gleason | 299/84 |
| 2,843,267 | 7/1958 | Anderson | 210/236 |
| 2,847,126 | 8/1958 | Goodman | 210/411 |
| 2,855,106 | 10/1958 | English | 210/492 |
| 2,873,030 | 2/1959 | Ashton | 210/488 |
| 2,889,048 | 6/1959 | Nordin | 210/409 |
| 2,892,240 | 6/1959 | Frankenhoff | 25/157 |
| 2,926,137 | 2/1960 | Calvert | 210/500 |
| 2,956,016 | 10/1960 | Leppla | 210/503 |
| 2,978,108 | 4/1951 | Strassheim | 210/488 |

(List continued on next page.)

Primary Examiner—Richard V. Fisher
Assistant Examiner—Wanda L. Millard
Attorney, Agent, or Firm—Pearne, Gordon, McCoy & Granger

[57] ABSTRACT

A backflushable filter including a housing having an inlet coupled to an upstream fluid inlet and an outlet coupled to a downstream fluid outlet, a filter assembly including a plurality of cylindrical filters, defining an upstream surface communication with the inlet and a downstream surface communication with an axial hollow volume therein, the axial hollow volume communicating with the outlet, a backflushing assembly comprising a backflushing nozzle disposed in each axial hollow volume for backflushing engagement with each of the cylindrical filters at its downstream surface, and a backflush drain communicating with the upstream surface.

15 Claims, 5 Drawing Sheets

U.S. PATENT DOCUMENTS

| | | | |
|---|---|---|---|
| 3,005,556 | 10/1961 | Jensen | 210/488 |
| 3,105,042 | 9/1963 | Roosa | 210/444 |
| 3,111,963 | 11/1963 | Brockwell | 210/492 |
| 3,151,071 | 9/1964 | Kasten | 210/488 |
| 3,195,730 | 7/1965 | Muller | 210/488 |
| 3,233,741 | 2/1966 | Bell | 210/500 |
| 3,272,342 | 9/1966 | McLaren et al. | 210/440 |
| 3,278,040 | 10/1966 | Goldberg | 210/500 |
| 3,282,435 | 11/1966 | Goldberg | 210/500 |
| 3,330,414 | 7/1967 | Mecky | 210/227 |
| 3,335,869 | 8/1967 | Hedges | 210/500 |
| 3,370,712 | 2/1968 | Smith | 210/492 |
| 3,382,982 | 5/1968 | Stevens | 210/184 |
| 3,445,002 | 5/1969 | Muller | 210/108 |
| 3,448,862 | 6/1969 | Kudlaty | 210/488 |
| 3,473,668 | 10/1969 | Bunyard | 210/492 |
| 3,503,511 | 3/1970 | Spitzberg | 210/232 |
| 3,511,374 | 5/1970 | Beal | 209/258 |
| 3,529,726 | 9/1970 | Keenan | 210/232 |
| 3,561,602 | 2/1971 | Molitor | 210/266 |
| 3,622,003 | 11/1971 | Czech | 210/108 |
| 3,647,084 | 3/1972 | Martin | 210/492 |
| 3,648,843 | 3/1972 | Pearson | 210/443 |
| 3,666,107 | 5/1972 | Boggs | 210/483 |
| 3,703,465 | 11/1972 | Reese et al. | 210/333.1 |
| 3,789,990 | 2/1974 | Drori | 210/310 |
| 4,026,806 | 5/1977 | Drori | 210/405 |
| 4,042,504 | 8/1977 | Drori | 210/107 |
| 4,045,345 | 8/1977 | Drori | 210/107 |
| 4,062,774 | 12/1977 | Hinojosa | 210/94 |
| 4,067,812 | 1/1978 | Drori | 210/310 |
| 4,082,057 | 4/1978 | Hayes | 118/9 |
| 4,115,274 | 9/1978 | Boddeker | 210/327.1 |
| 4,119,540 | 10/1978 | Muller | 210/142 |
| 4,156,651 | 5/1979 | Mehoudar | 210/108 |
| 4,204,961 | 5/1980 | Cusato Jr. | 210/232 |
| 4,207,181 | 6/1980 | Drori | 55/405 |
| 4,210,538 | 7/1980 | Tantillo et al. | 210/333.1 |
| 4,213,861 | 7/1980 | Muller et al. | 210/333.1 |
| 4,251,374 | 2/1981 | Cunningham | 210/232 |
| 4,267,042 | 5/1981 | Hofmann | 210/169 |
| 4,267,045 | 5/1981 | Hoof | 210/322 |
| 4,271,018 | 6/1981 | Drori | 210/411 |
| 4,278,540 | 7/1981 | Drori | 210/107 |
| 4,284,500 | 8/1981 | Keck | 209/250 |
| 4,295,963 | 10/1981 | Drori | 210/108 |
| 4,297,209 | 10/1981 | De Visser et al. | 210/107 |
| 4,308,142 | 12/1981 | Braukmann | 210/355 |
| 4,312,374 | 1/1982 | Drori | 137/469 |
| 4,402,829 | 9/1983 | Cordua | 210/333.01 |
| 4,410,430 | 10/1983 | Hagler Jr. | 210/446 |
| 4,430,232 | 2/1984 | Doucet | 210/798 |
| 4,435,287 | 3/1984 | Sumimoto | 210/488 |
| 4,462,916 | 7/1984 | Ecabert | 210/798 |
| 4,468,319 | 8/1984 | Laakso | 210/97 |
| 4,481,111 | 11/1984 | Christophe et al. | 210/333.01 |
| 4,495,068 | 1/1985 | Rosaen | 210/130 |
| 4,517,089 | 5/1985 | Arnaud | 210/488 |
| 4,552,655 | 11/1985 | Granot | 210/108 |
| 4,552,662 | 11/1985 | Webster et al. | 210/232 |
| 4,572,784 | 2/1986 | Drori | 210/133 |
| 4,582,603 | 4/1986 | Nasse | 210/323.2 |
| 4,592,838 | 6/1986 | Christophe et al. | 210/323.1 |
| 4,592,839 | 6/1986 | Rosenberg | 210/352 |
| 4,614,581 | 9/1986 | Drori | 210/108 |
| 4,624,785 | 11/1986 | Drori | 210/414 |
| 4,642,182 | 2/1987 | Drori | 210/232 |
| 4,642,188 | 2/1987 | DeVisser et al. | 210/333.1 |
| 4,654,143 | 3/1987 | Drori | 210/232 |
| 4,655,910 | 4/1987 | Tabor | 210/107 |
| 4,655,911 | 4/1987 | Tabor | 210/107 |
| 4,683,060 | 7/1987 | Drori | 210/448 |
| 4,707,258 | 11/1987 | Drori | 210/333.1 |
| 4,732,673 | 3/1988 | Dagard et al. | 210/247 |
| 4,735,730 | 4/1988 | Bratten | 210/741 |
| 4,744,901 | 5/1988 | Drori | 210/323.1 |
| 4,751,000 | 6/1988 | Drori | 210/448 |
| 4,753,731 | 6/1988 | Drori | 210/492 |
| 4,781,825 | 11/1988 | Grimes et al. | 210/107 |

FOREIGN PATENT DOCUMENTS

| | | |
|---|---|---|
| 126722 | 2/1948 | Australia . |
| 156599 | 5/1954 | Australia . |
| 156721 | 5/1954 | Australia . |
| 549633 | 12/1957 | Canada . |
| 586111 | 11/1959 | Canada . |
| 0177434 | 10/1985 | European Pat. Off. . |
| 846245 | 6/1952 | Fed. Rep. of Germany . |
| 1007743 | 5/1957 | Fed. Rep. of Germany . |
| 1289827 | 2/1969 | Fed. Rep. of Germany . |
| 2453445 | 5/1976 | Fed. Rep. of Germany . |
| 3044843 | 9/1981 | Fed. Rep. of Germany . |
| 899337 | 5/1945 | France . |
| 1157258 | 2/1963 | France . |
| 1543176 | 9/1968 | France . |
| 68288 | 5/1968 | Israel . |
| 69638 | 1/1983 | Israel . |
| 69679 | 6/1983 | Israel . |
| 68935 | 9/1983 | Israel . |
| 473331 | 7/1952 | Italy . |
| 44-2936 | 2/1969 | Japan . |
| 10814 | 7/1884 | United Kingdom 210/488 |
| 300600 | 11/1928 | United Kingdom . |
| 570960 | 7/1945 | United Kingdom . |
| 570960 | 7/1945 | United Kingdom . |
| 687967 | 2/1953 | United Kingdom . |
| 841207 | 7/1960 | United Kingdom . |
| 926600 | 5/1963 | United Kingdom . |
| 1096739 | 12/1967 | United Kingdom . |

OTHER PUBLICATIONS

Spielman, Lloyd A., "Particle Capture From Low-Speed Laminar Flows", Am. Rev. Fluid Mech. 1977, 9:297–319.

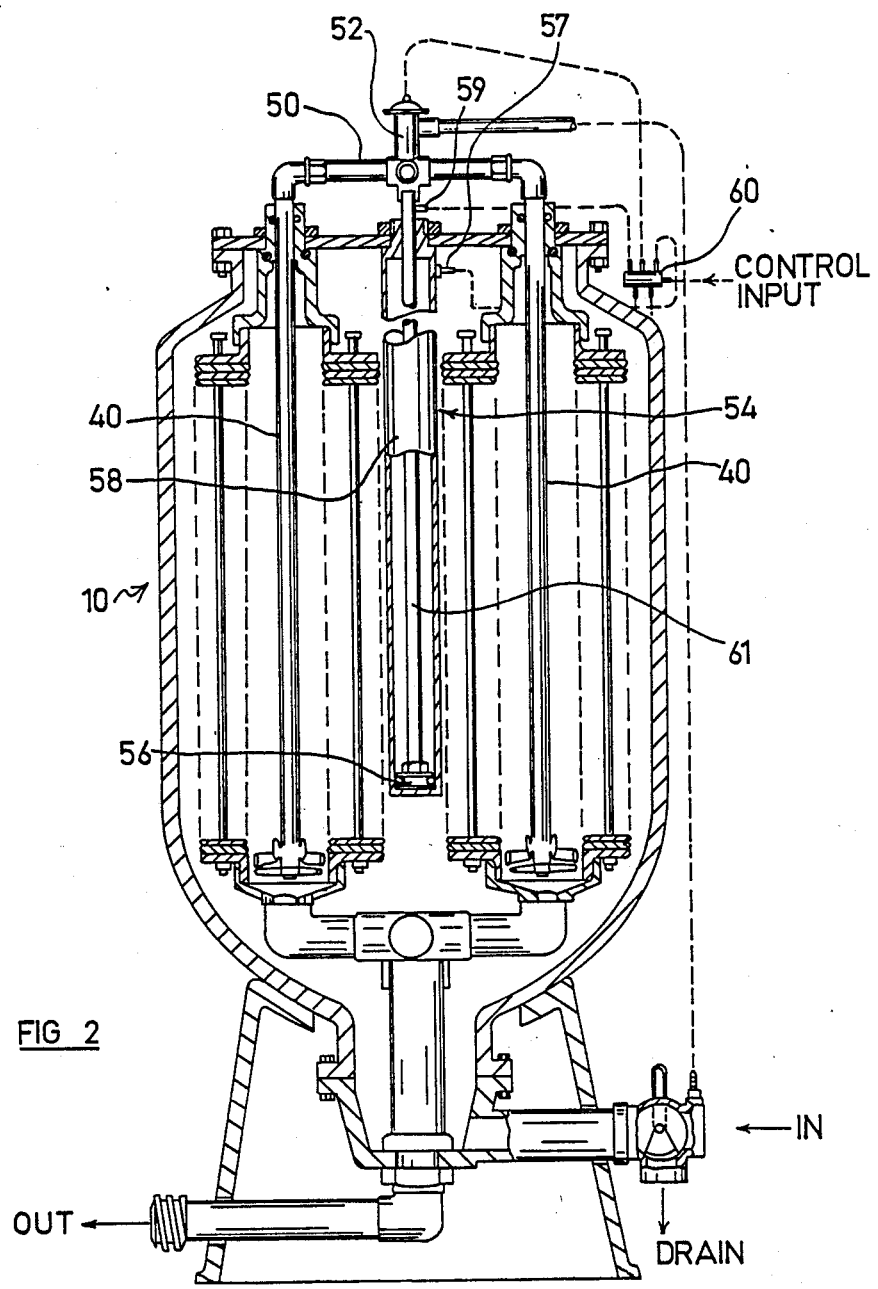

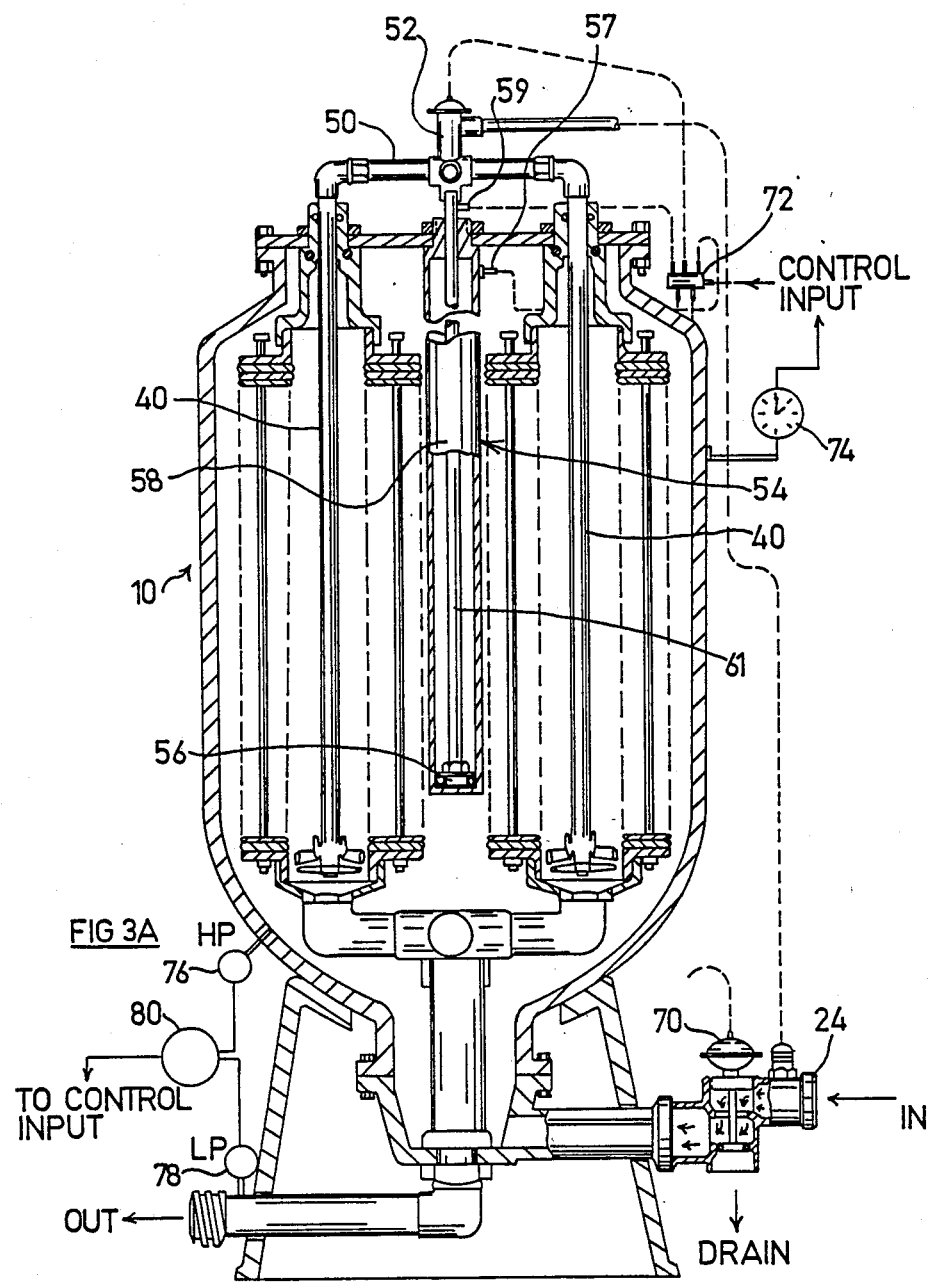

4,906,357

FILTER SYSTEM HAVING MULTIPLE FILTER ELEMENTS AND BACK FLUSHING ASSEMBLIES

FIELD OF THE INVENTION

The present invention relates to filters generally and more particularly to filters which are cleanable by backflushing.

BACKGROUND OF THE INVENTION

There are known various types of filters for use in agricultural, domestic and industrial applications. One particularly successful type of filter is the disc filter, which is exemplified in some of the following U.S. patents of the present applicant: U.S. Pat. Nos. 4,005,884; 4,012,176; 4,026,806; 4,042,504; 4,045,345; 4,067,812; 4,077,371; 4,207,181; 4,271,018; 4,295,963; 4,312,374.

SUMMARY OF THE INVENTION

The present invention seeks to provide an improved backflushable multi-stack filter.

There is thus provided in accordance with a preferred embodiment of the present invention a backflushable filter including a housing having an inlet coupled to an upstream fluid inlet and an outlet coupled to a downstream fluid outlet, a filter assembly including a plurality of cylindrical filters, defining an upstream surface communicating with the inlet and a downstream surface communicating with an axial hollow volume therein, the axial hollow volume communicating with the outlet, a backflushing assembly comprising a backflushing nozzle disposed in each axial hollow volume for backflushing engagement with each of the cylindrical filters at its downstream surface, and a backflush drain communicating with the upstream surface.

In accordance with a preferred embodiment of the invention, the backflushing nozzle is a fluid-driven rotating backflushing nozzle.

Further in accordance with a preferred embodiment of the invention, there is also provided a backflush selection valve operative to selectably couple either the upstream fluid inlet or the backflush drain with the inlet.

Additionally in accordance with a preferred embodiment of the present invention, the backflushing assembly comprises a manifold for physically joining, supporting and supplying fluid to the plurality of backflushing nozzles.

In accordance with a preferred embodiment of the present invention, the housing is formed with a body portion and a top closing portion.

In accordance with a preferred embodiment of the invention, each of the cylindrical filters comprises a disk filter formed of a stack of filter disks.

Additionally in accordance with a preferred embodiment of the present invention, apparatus is provided for selectably raising and lowering each fluid driven backflushing nozzle axially through the axial hollow volume of each cylindrical filter for systematic backflushing of substantially the entire filter.

In accordance with a preferred embodiment of the invention, the apparatus for selectably raising and lowering comprises a fluid operated piston.

Further in accordance with a preferred embodiment of the invention, the fluid operated piston is located within the filter housing.

Additionally in accordance with a preferred embodiment of the invention, the fluid operated piston is operative to position and support the backflushing assembly during filtering operation of the filter.

Further in accordance with a preferred embodiment of the present invention, there is provided apparatus for automatically controlling operation of the apparatus for selectably raising and lowering and for coordinating therewith the supply of backflushing fluid to the fluid driven backflushing nozzle.

Additionally in accordance with a preferred embodiment of the present invention, the apparatus for automatically controlling is also operative to control the operation of the backflush selection valve.

BRIEF DESCRIPTION OF THE DRAWINGS

The present invention will be understood and appreciated more fully from the following detailed description, taken in conjunction with the drawings in which:

FIG. 2 is a side sectional illustration of a semi-automatic multi-stack backflushable filter constructed and operative in accordance with a preferred embodiment of the present invention in a filtering orientation; and FIGS. 3A and 3B are side sectional illustrations of a fully-automatic multi-stack backflushable filter constructed and operative in accordance with a preferred embodiment of the present invention in respective filtering and backflushing orientations.

DETAILED DESCRIPTION OF PREFERRED EMBODIMENTS

Figure 1A:
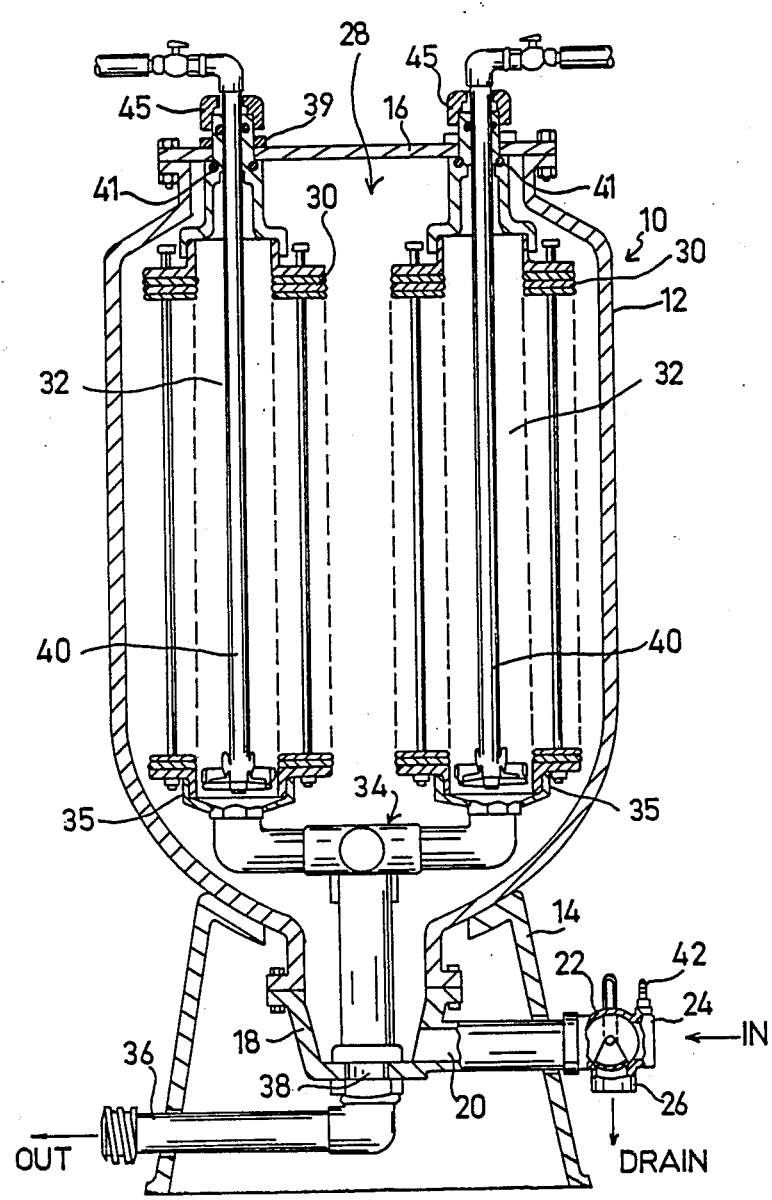
FIGS. 1A and 1B are side sectional illustrations of a multi-stack backflushable filter constructed and operative in accordance with a preferred embodiment of the present invention in respective filtering and backflushing orientations.
Figure 1B:
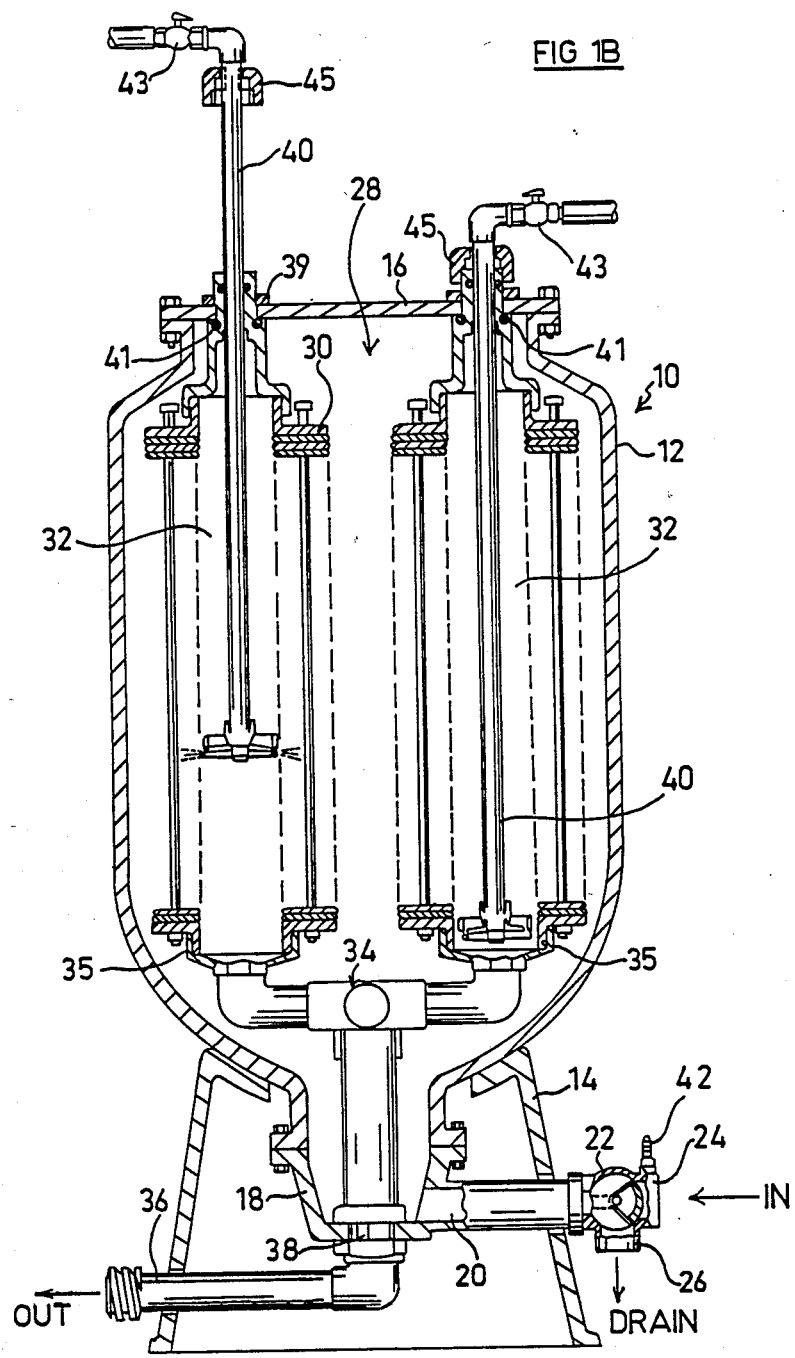

Reference is now made to FIGS. 1A and 1B, which illustrate a multi-stack backflushable filter constructed and operative in accordance with a preferred embodiment of the present invention and comprising a housing 10 including a body portion 12, supported on a base 14, a removable top cover 16, and a bottom portion 18. Bottom portion 18 defines a fluid inlet 20 which communicates with a backflush control valve 22, typically manually operated and of conventional construction, which provides selectable communication between either one of an upstream fluid inlet 24 or a backflush drain 26 with the fluid inlet 20, which also serves an a backflush outlet.

A filter assembly 28, comprising a plurality of cylindrical filters 30, such as disk filter stacks, typically four in number, is disposed within housing 10. The filter assembly defines an upstream surface, here the outer surface of each of the cylindrical filters 30, which communicates with the upstream fluid inlet 24 during filter operation and with the backflush drain 26 during backflush operation.

The filter assembly also defines a downstream surface, here the inner surface of each of the cylindrical filters 30 which lies adjacent an axial and normally cylindrical volume 32 located within each of the cylindrical filters. The downstream surface communicates via cylindrical volume 32 and a manifold 34 with a downstream fluid outlet 36 via a housing outlet 38.

According to a preferred embodiment of the invention, each of the cylindrical filters comprises a filter stack of the type illustrated, for example in any of the following U.S. Patents and patent applications of applicant, the disclosures of which are hereby incorporated by reference: U.S. Pat. Nos. 4,005,884; 4,012,176; 4,026,806; 4,042,504; 4,045,345; 4,067,812; 4,077,371; 4,207,181; 4,271,018; 4,295,963; 4,312,374; U.S. patent application 013,248 filed Feb. 10, 1987.

Each of the cylindrical filters is supported from the bottom by manifold 34 and bottom support connectors 35 and is sealingly mounted on the top cover member 16 by means of suitable threaded sealing collars 39 and associated sealing rings 41.

Further in accordance with a preferred embodiment of the invention, each of the cylindrical filters is provided with a fluid driven backflushing nozzle assembly 40, whose structure and operation is described in one or more of the following U.S. Patent and patent applications of applicant, the disclosures of which are hereby incorporated by reference: U.S. Pat. Nos. 4,005,884; 4,012,176; 4,026,806; 4,042,504; 4,045,345; 4,067,812; 4,077,371; 4,207,181; 4,271,018; 4,295,963; 4,312,374; 4,624,785; U.S. patent application 013,248 filed Feb. 10, 1987.

A fluid supply to each of the backflushing nozzle assemblies 40 is provided from any source of pressurized fluid, and typically from a fluid connection 42 coupled to the upstream fluid inlet 24.

FIG. 1A illustrates the filter of the present invention in a filtering mode, wherein the upstream fluid inlet 24 is coupled to the interior of the housing 10 and thus to the upstream side of the filter assembly, and the downstream side of the filter assembly is coupled to the downstream fluid outlet 36.

FIG. 1B illustrates the filter of the present invention in a backflushing mode, wherein the upstream fluid inlet 24 is decoupled from the interior of the housing by the backflush control valve 22, which couples the interior of the housing to the backflush drain 26, while backflushing fluid is supplied to the backflushing nozzle assembly 40, as from fluid connection 42 via a backflushing fluid supply valve 43. This backflushing fluid is caused to systematically impinge under pressure on substantially the entire downstream surface of the filter assembly, by fluid driven rotation of the nozzle and typically manual displacement thereof along its longitudinal axis as shown in FIG. 1B.

Whereas in the embodiment of FIGS. 1A and 1B, each of the backflushing nozzle assemblies 40 were independently and manually displaceable along their longitudinal axes in the embodiment of FIG. 2, the nozzle assemblies 40 are coupled together as by a manifold 50, with which is associated a common backflush fluid supply valve 52.

In the embodiment of FIG. 2, the joined backflushing nozzle assemblies 40 and the manifold 50 are supported and selectably axially displaced by a fluid operated piston assembly 54, which is preferably disposed within the housing 10. The axial orientation of the nozzle assemblies 40 in the cylindrical filters is determined by the axial orientation of a piston 56 in a cylinder 58. This in turn is determined by the supply of pressurized fluid to the cylinder 58. Pressurized fluid is supplied to cylinder 58 from two inlets, 57 and 59. Inlet 57 communicates with the interior of the cylinder 58 above the piston 56, while inlet 59 communicates with the interior of the cylinder below piston 56 via a conduit formed in a piston rod 61.

Whereas, in the embodiment of FIGS. 1A and 1B, the backflushing nozzle assemblies 40 are individually held in place during filtering operation by means of threaded securing collar members 45, in contrast, in the embodiment of FIG. 2, the joined backflushing nozzle assemblies 40 and manifold 50 are together held in place by the operation of piston assembly 54. The position of the piston assembly and thus of the joined backflushing nozzle assemblies 40 is determined by the relative volumes of pressurized fluid located above and below piston 56 in cylinder 58.

The supply of pressurized fluid to the cylinder 58 is governed by a fluidic control device 60, such as an actuator selected from among PE actuators commercially available from Baccara of Kvutzat Geva, Israel, which is also operative to control the operation of backflush fluid supply valve 52. Fluidic control device 60 may be responsive to manual controls, a timer or alternatively may be condition responsive as to a sensed pressure or pressure differential in the filter.

Figure 3B:
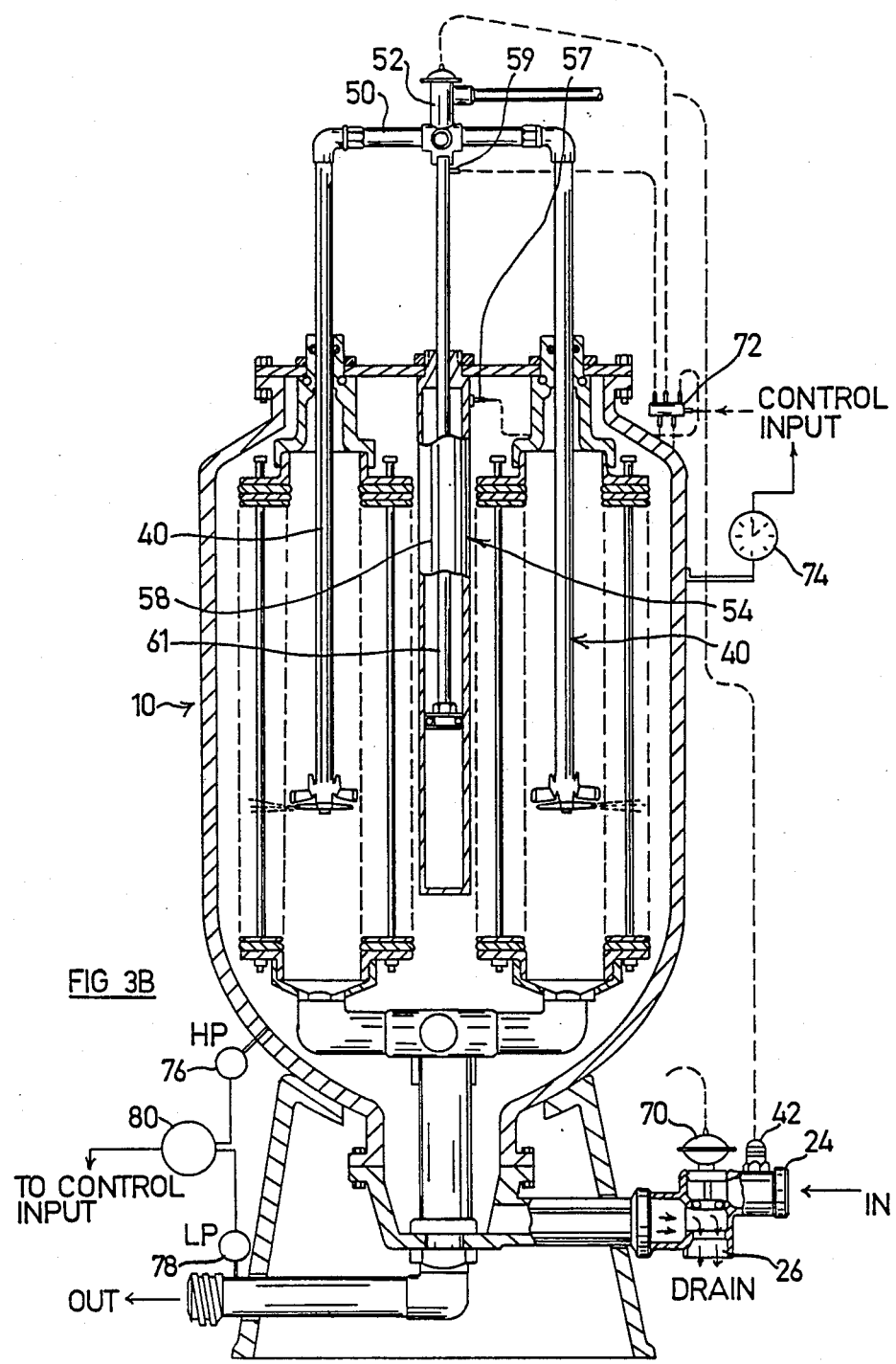

Reference is now made to FIGS. 3A and 3B, which illustrate a fully automatic filter constructed and operative in accordance with a preferred embodiment of the present invention. The filter of FIGS. 3A and 3B is similar to that shown in FIG. 2, the same reference numerals being used to show similar elements, with the additional provision of a remotely controllable backflush control valve 70, such as a hydraulic actuated valve commercially available from Barmad, of Kibbutz Evron, Israel, in place of the manually operative valve 22 employed in the embodiment of FIGS. 1A, 1B and 2.

In the embodiment of FIGS. 3A and 3B, a fluidic control device 72, such as an actuator selected from among PE actuators commercially available from Baccara of Kvutzat Geva, Israel, operates not only piston assembly 54 and backflush fluid supply valve 52, but also operates backflush control valve 70, all in a correct sequence to provide desired backflush operation.

The desired sequence is preferably as follows: In response to a control input indicating that automatic backflushing operation is called for, valve 70 cuts off the input fluid flow to the upstream side of the filter stack and couples the upstream side of the filter stack to the backflush drain. Typically after a short delay which permits draining of the fluid at the upstream side of the filter stack, which delay can be set to zero, valve 52 is opened to provide a supply of pressurized backflushing fluid to the backflushing nozzle assembly 40. Typically simultaneously input 57 of the piston and cylinder assembly is vented to the atmosphere or reduced in pressure and pressurized fluid is supplied to input 59 of the piston and cylinder assembly so as to cause raising of the piston and of the entire backflushing assembly from the orientation shown in FIG. 3A to a fully raised orientation, through the orientation shown in FIG. 3B.

When the backflush assembly reaches the fully raised position, the direction of axial displacement of the piston is reversed. This may be done by means of suitable control inputs from control circuitry 72, which effectively reverses the hydraulic inputs to inputs 57 and 59. The control circuitry 72 may operate in this manner on the basis of a suitably calibrated timing signal from a timer 74 or on the basis of a direction change signal as from a microswitch (not shown) which is engaged, when the backflush assembly reaches its fullly raised position.

Initiation of backflush operation may be provided in response to the operation of a timer 74, a manual input, or a sensed pressure difference between the inlet and outlet of the filter. This may be sensed by pressure sensors 76 and 78 associated with a differential pressure control 80.

FIG. 3A illustrates the automatic filter of the present invention in a filtering mode, wherein the upstream fluid inlet 24 is coupled to the interior of the housing 10 and thus to the upstream side of the filter assembly and the downstream side of the filter assembly is coupled to the downstream fluid outlet 36. The piston assembly 54 raises and lowers the backflushing nozzle assemblies 40 and manifold 50.

FIG. 3B illustrates the filter of the present invention in a backflushing mode, wherein the upstream fluid inlet 24 is decoupled from the interior of the housing by the remotely controlled backflush control valve 70, which couples the interior of the housing to the backflush drain 26, while backflushing fluid is supplied to the backflushing nozzle assemblies 40, as from fluid connection 42 via valve 52. This backflushing fluid is caused to systematically impinge under pressure on substantially the entire downstream surface of the filter assembly, by fluid driven rotation of the nozzle. The nozzles are axially raised and then axially lowered by suitable operation of the piston assembly 54.

It will be appreciated by persons skilled in the art that the present invention is not limited to what has been particularly shown and described hereinabove. Rather the scope of the present invention is defined only by the claims which follow:

I claim:

1. A backflushable filter system comprising:
   a housing having a housing inlet coupled to an upstream fluid inlet and a housing outlet coupled to a downstream fluid outlet;
   a filter assembly including a plurality of cylindrical filters, each individual one of said plurality of cylindrical filters defining an upstream surface communicating with said housing inlet and a downstream surface communicating with an axial hollow volume within said individual one of said plurality of cylindrical filters, said axial hollow volume communicating with said housing outlet;
   a backflushing assembly comprising a plurality of backflushing nozzles, one of said plurality of backflushing nozzles being disposed in each said axial hollow volume for backflushing engagement with the corresponding one of said plurality of cylindrical filters at its downstream surface;
   a backflush drain communicating with said upstream surface; and
   means for selectably raising and lowering each of said plurality of backflushing nozzles axially through said axial hollow volume of each individual one of said plurality of cylindrical filters for systematic backflushing of substantially the entirety of each individual one of said plurality of cylindrical filters.

2. A backflushable filter system according to claim 1 and wherein each of said plurality of backflushing nozzles comprises a fluid-driven rotating backflushing nozzle.

3. A backflushable filter system according to claim 1 and also comprising a backflush selection valve for selectably coupling either said upstream fluid inlet or said backflush drain with said housing inlet.

4. A backflushable filter system according to claim 1 and wherein said backflushing assembly also comprises a manifold for physically joining, supporting and supplying fluid to said plurality of backflushing nozzles.

5. A backflushable filter system according to claim 1 and wherein said backflushing assembly also comprises a manifold for physically joining and supporting said plurality of backflushing nozzles.

6. A backflushable filter system according to claim 1 and wherein said backflushing assembly also comprises a manifold for physically joining and supplying fluid to said plurality of backflushing nozzles.

7. A backflushable filter system according to claim 1 and wherein said housing is formed with a body portion and a top closing portion.

8. A backflushable filter system according to claim 1 and wherein each of said plurality of cylindrical filters comprises a disk filter formed of a stack of filter disks.

9. A backflushable filter system according to claim 1 and wherein said means for selectably raising and lowering comprise means for permitting selectable raising and lowering of the entire said plurality of backflushing nozzles simultaneously.

10. A backflushable filter system according to claim 1 and wherein said means for selectably raising and lowering comprise means for permitting selectable raising and lowering of individual ones of said plurality of backflushing nozzles.

11. A backflushable filter system according to claim 1 and wherein said means for selectably raising and lowering comprises a fluid operated piston.

12. A backflushable filter system according to claim 11 and wherein said fluid operated piston is located within said housing.

13. A backflushable filter system according to claim 11 and wherein said fluid operated piston is operative to position and support said backflushing assembly during filtering operation.

14. A backflushable filter system according to claim 1 and also comprising means for automatically controlling operation of said means for selectably raising and lowering and for coordinating therewith the supply of backflushing fluid to said individual ones of said plurality of backflushing nozzles.

15. A backflushable filter system according to claim 14 and also comprising a backflush selection valve for selectably coupling either said upstream fluid inlet or said backflush drain with said housing inlet, wherein said means for automatically controlling is also operative to control the operation of said backflush selection valve.

* * * * *